United States Patent
Wang et al.

(10) Patent No.: US 12,259,517 B2
(45) Date of Patent: Mar. 25, 2025

(54) METHODS FOR PREDICTING AND MONITORING DOWNHOLE SALINITY VARIATIONS

(71) Applicants: Schlumberger Technology Corporation, Sugar Land, TX (US); SAUDI ARABIAN OIL COMPANY, Dhahran (SA)

(72) Inventors: Gong Li Wang, Sugar Land, TX (US); Wael Abdallah, Sugar Land, TX (US); Shouxiang Ma, Dhahran (SA); Sherif Ghadiry, Dhahran (SA)

(73) Assignees: SCHLUMBERGER TECHNOLOGY CORPORATION, Sugar Land, TX (US); SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 18/717,453

(22) PCT Filed: May 20, 2022

(86) PCT No.: PCT/US2022/030202
§ 371 (c)(1),
(2) Date: Jun. 7, 2024

(87) PCT Pub. No.: WO2023/224632
PCT Pub. Date: Nov. 23, 2023

(65) Prior Publication Data
US 2024/0418899 A1 Dec. 19, 2024

(51) Int. Cl.
*G01V 3/38* (2006.01)
*G01V 3/18* (2006.01)
*G06N 20/00* (2019.01)

(52) U.S. Cl.
CPC .............. *G01V 3/38* (2013.01); *G01V 3/18* (2013.01); *G06N 20/00* (2019.01)

(58) Field of Classification Search
CPC ............ G01V 3/38; G01V 3/18; G06N 20/00
See application file for complete search history.

(56) References Cited

U.S. PATENT DOCUMENTS 7,555,390 B2 * 6/2009 Ramakrishnan ......... G01V 3/38
73/152.08
9,540,574 B2 * 1/2017 Janssen ................... E21B 43/34
(Continued)

OTHER PUBLICATIONS

Salazar et al; Combined simulation and inversion of SP and resistivity logs for the estimation of connate-water resistivity and Archie's cementation exponent, 2008.*
(Continued)

*Primary Examiner* — Mohamed Charioui
*Assistant Examiner* — Lynda Dinh
(74) *Attorney, Agent, or Firm* — Jeffrey D. Frantz

(57) ABSTRACT

Methods and systems are provided for characterizing connate water salinity and resistivity of a subsurface formation. Well log data including resistivity and spontaneous potential (SP) log data are measured by at least one downhole tool disposed within a borehole. The resistivity and SP log data are inverted to determine a resistivity model and an SP model, which are used to determine connate water resistivity. The connate water resistivity is used to determine connate water salinity. The connate water salinity derived from the inversion of resistivity log data and SP log data (or derived from a trained ML system supplied with such log data) can be used as a baseline measure of connate water salinity, and this baseline measure can be evaluated together with the connate water salinity estimates derived from pulsed neutron tool measurements over time-lapsed periods of production to monitor variation in connate water salinity due to production.

20 Claims, 10 Drawing Sheets

(56) References Cited

U.S. PATENT DOCUMENTS

| | | | |
|---|---|---|---|
| 10,208,582 B2 | 2/2019 | Ma | |
| 10,247,849 B2 | 4/2019 | Pfutzner | |
| 10,385,677 B2* | 8/2019 | Gzara | E21B 43/00 |
| 10,499,031 B2* | 12/2019 | Ayari | G06N 20/00 |
| 10,571,600 B2* | 2/2020 | Cao Minh | E21B 47/12 |
| 2007/0246649 A1 | 10/2007 | Jacobi | |
| 2010/0299126 A1 | 11/2010 | Chugunov | |
| 2019/0323344 A1 | 10/2019 | Garcia | |
| 2021/0301655 A1 | 9/2021 | Ranganathan | |

OTHER PUBLICATIONS

Bennis et al; Estimation of Dynamic Petrophysical Properties From Multiple Well Logs Using Machine Learning and Unsupervised Rock Classification, 2019.*

Donadille et al; Water Salinity Determination Over an Extended Salinity Range Using a Joint Interpretation of Dielectric and Neutron Cross-Section Measurements, 2016.*

Fons et al; Some Pulsed Neutron Logging Contributions To Improved Formation Evaluation, 1970.*

Doll, H. G., "The SP log: Theoretical Analysis and Principles of Interpretation", Transactions of American Institute of Mining, Metallurgical and Petroleum Engineers, 1949, 179, pp. 146-185.

Morris, C. et al., "Reservoir Monitoring with Pulsed Neutron Capture Logs", SPE 94199, 2005 SPE Europec/EAGE Annual Conference, Madrid, Spain. 16 pages.

Salazar, J. M. et al., "Combined Simulation and Inversion of SP and Resistivity Logs for the Estimation of Connate-Water Resistivity and Archie"s Cementation Exponent", Geophysics, 2008, 73(3), pp. E107-E114.

Segesman, F., "New SP Correction Charts", Geophysics, 1962, 27(6), pp. 815-828.

Zhang, G. J. et al., "Application of vector potential theory to spontaneous potential calculation", Radio Science, 1997, 32, pp. 899-905.

Zhang, G. J. et al., "A New Approach to SP Computation-Vector Potential Approach", IEEE Transactions on Geoscience and Remote Sensing, 1999, 37(4), 2092-2098.

Clinch, S. et al., "Determining Formation Water Salinity in the Hydrocarbon Leg using Cores and Logs," Petrophysics, 2011, 52(2), pp. 108-123.

Ma, S. M. et al., "Resolving the Mixed Salinity Challenges with a Methodology Developed from Pulsed Neutron Capture Gamma Ray Spectral Measurements", SPE 170608, presented at the Annual Technical Conference and Exhibition, Amsterdam, The Netherlands, 2014, 12 pages.

Tian, L. et al., "A Neutron-Induced Gamma-Ray Spectroscopy Logging Method for Determining Formation Water Salinity," SPWLA 60th Annual Logging Symposium, The Woodlands, TX, USA, 2019, 11 pages.

Donadille, J. M. et al., "Water Salinity Determination Over an Extended Salinity Range Using a Joint Interpretation of Dielectric and Neutron Cross-Section Measurements, "SPE-181366-MS, presented at the SPE Annual Technical Conference and Exhibition, Dubai, UAE, 2016, 18 pages.

Hu, L. et al., "Joint Inversion of HDIL and SP with a Five-Parameter Model for Estimation of Connate Water Resistivity", Chinese Journal of Geophysics, 2013, 56(2), pp. 223-231.

"Formation Evaluation in Cased Holes", Chapter 3 in Cased Hole Log Interpretation Principles/Applications, Schlumberger, 1989, 4th Printing, pp. 3.1 through 3.7.

* cited by examiner

METHODS FOR PREDICTING AND MONITORING DOWNHOLE SALINITY VARIATIONS

CROSS-REFERENCE TO RELATED APPLICATIONS

The present application is a National Stage Entry of International Patent Application No. PCT/US2022/030202, filed May 20, 2022, which is incorporated herein by reference in its entirety.

FIELD

The present disclosure relates to methods that characterize formation properties, such as connate water resistivity and connate water salinity, of hydrocarbon-bearing subsurface formations.

BACKGROUND

Connate water resistivity ($R_w$) and connate water salinity ($C_w$) of a hydrocarbon-bearing subsurface formation (i.e., oil and/or gas reservoir) is an important parameter that is used to estimate water saturation of the formation. The water saturation of the formation is used to calculate the saturation of hydrocarbons (oil and/or gas) in the formation and the amount of hydrocarbons that can be produced from the reservoir.

Different methods have been used to measure the salinity ($C_w$) of the connate water found within formation rock.

In one example, downhole fluid sampling methods can be used to obtain a sample of connate water. The sample can be analyzed by laboratory methods to measure the salinity of the connate water at the sampling point. The connate water samples are often taken at high drawdown pressure, and such samples are often contaminated with drilling mud filtrate and/or reservoir hydrocarbons.

In another example, it has been suggested that downhole NMR measurements can be used to understand changes to connate water salinity. See, for example, Clinch, S.; Shafer, S.; Wei, W.; Lasswell, P., "Determining Formation Water Salinity in the Hydrocarbon Leg using Cores and Logs," PETROPHYSICS, 52(2), 108-123, 2011.

In yet another example, pulsed neutron gamma spectral methods can be used to measure connate water salinity. See, for example, i) Ma., S. M.; Pfutzner, H.; A L-Hajiri, A. A.; et al., "Resolving the mixed salinity challenges with a methodology developed from pulsed neutron capture gamma ray spectral measurements", SPE 170608, Annual Technical Conference and Exhibition Society of Petroleum Engineers, 2014; ii) Ma, S. M., et al., "Formation water salinity from borehole measurements," U.S. Pat. No. 10,208, 582, 19 Feb. 2019; iii) Pfutzner, H., et al., "Method for measuring formation water salinity from within a borehole," U.S. Pat. No. 10,247,849, 2 Apr. 2019; and iv) Tian, L.; Zhang, F.; Zhang, Q.; Chen, Q; Wang, X.; Qui, F. "A neutron-induced Gamma-Ray Spectroscopy Logging Method for Determining Formation Water Salinity," SPWLA 60th Annual Logging Symposium, The Woodlands, TX, USA, Jun. 15-19, 2019. See also Morris, C., Aswad, T., Morris, F. and Quinlan, T., 2005, Reservoir Monitoring with Pulsed Neutron Capture logs, SPE 94199, SPE Europec/EAGE Annual Conference, June 13-16, Madrid, Spain.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with the subject disclosure, methods and systems are provided for characterizing connate water of a subsurface formation. Well log data, which includes resistivity log data and spontaneous potential (SP) log data, is measured by at least one downhole tool disposed within a borehole that traverses the formation. Inversion operations are performed that invert the resistivity log data and the SP log data to determine a resistivity model and an SP model. The resistivity model and the SP model are used to determine data representing connate water resistivity of the formation. Data representing connate water salinity of the formation is determined from the data representing connate water resistivity of the formation.

In embodiments, some or all of the operations can be performed by a processor.

In embodiments, the inversion operations can involve a first inversion followed by a second inversion, wherein the first inversion is configured to invert the resistivity log data in order to determine the resistivity model, and wherein the second inversion is configured to invert the SP log data using data from the resistivity model determined from the first inversion in order to determine the SP model.

In other embodiments, the inversion operations can be configured to invert the resistivity log data and the SP log data in order to jointly determine both the resistivity model and the SP model.

In embodiments, the inversion operations can be configured to employ at least one parameter that affects spontaneous potential of the borehole and/or connate water resistivity of the formation, wherein a data value for the at least one parameter is obtained from surface measurements or well log measurements. In one example, the at least one parameter can be selected from the group that includes resistivity of the mud ($R_m$), resistivity of mud filtrate ($R_{mf}$), borehole diameter ($D_h$), formation temperature (T), formation thickness (h), and combinations thereof.

In embodiments, the resistivity model can include diameter of the invasion ($D_i$), resistivity of an invaded zone ($R_{xo}$), and resistivity of an undisturbed zone ($R_t$).

In embodiments, the inversion operations can be configured to determine connate water resistivity for an interval of the borehole specified by a depth range z by minimizing a cost function of the form:

$$\zeta(R_w) = \int dz \left[ SP^M(z) - SP(z, R_w, R_{mf}, R_m, T, R_{xo}, R_t, D_i, D_h, h) \right]^2$$

where $SP^M$ is the measured SP log data for the interval of the borehole specified by depth range z; $R_m$ is resistivity of the mud, $R_{mf}$ is resistivity of mud filtrate, $D_h$ is borehole diameter, T is formation temperature, and h is formation thickness, each obtained from surface measurements or well log data; and $D_i$ is diameter of the invasion zone, where $D_i$, $R_{xo}$, and $R_t$ are part of a resistivity model of the formation that is determined through inversion of the resistivity log data; and $R_w$ is the connate water resistivity.

In embodiments, the inversion operations can be based on assumption that a linear relationship exists between resistivity and salinity for both mud filtrate and connate water.

In embodiments, the inversion operations can be based on assumption that the relationship of resistivity and salinity for both mud filtrate and connate water is dependent on temperature and salt concentration and composition.

In embodiments, the inversion operations can be based on assumption of a step profile invasion for mud filtrate invasion.

In embodiments, the inversion operations can employ a parametric model or a pixel-based inversion.

In embodiments, the resistivity log data can be obtained from an array induction resistivity tool disposed within the borehole.

In embodiments, the at least one downhole tool can include a logging—while drilling tool, a wireline tool, or other downhole tool.

The methods and systems can further involve using the data representing connate water salinity of the formation as determined from the inversion of the resistivity log data and SP log data as training data for training a machine learning model that outputs data representing connate water salinity of the formation given an input data vector based on well log data that includes resistivity log data and spontaneous potential (SP) log data.

In embodiments, the input data vector can further include parameter data for at least one parameter that affects spontaneous potential of the borehole and/or connate water resistivity of the formation. Such parameter data can be obtained from surface measurements or well log measurements. In one example, the at least one parameter can be selected from the group that includes resistivity of the mud ($R_m$), resistivity of mud filtrate ($R_{mf}$), borehole diameter ($D_h$), formation temperature (T), formation thickness (h), and combinations thereof.

The methods and systems can further involve using the data representing connate water salinity of the formation as determined from the inversion of the resistivity log data and SP log data as a baseline measure of connate water salinity of the formation.

Well log data, such as PN (pulsed neutron) log data, obtained from downhole tool measurements can be used to determine data representing connate water salinity that results from one or more time intervals of production. The baseline measure of connate water salinity of the formation can be evaluated together with the data representing connate water salinity that results from one or more time intervals of production to characterize connate water of the formation during production.

In embodiments, the production involves application of at least one enhanced oil recovery (EOR) technique, such as natural gas driven production, water flooding, or other primary, secondary, and tertiary EOR technique.

In embodiments, PN log data is used to generate an input data vector that is supplied to a trained machine learning model that outputs data representing connate water salinity of the formation that results from a time interval of production given the input data vector.

In other embodiments, dielectric dispersion measurements and optionally pulsed-neutron sigma measurements of the formation can be inverted to generate data representing connate water salinity of the formation that results from a time interval of production.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1:
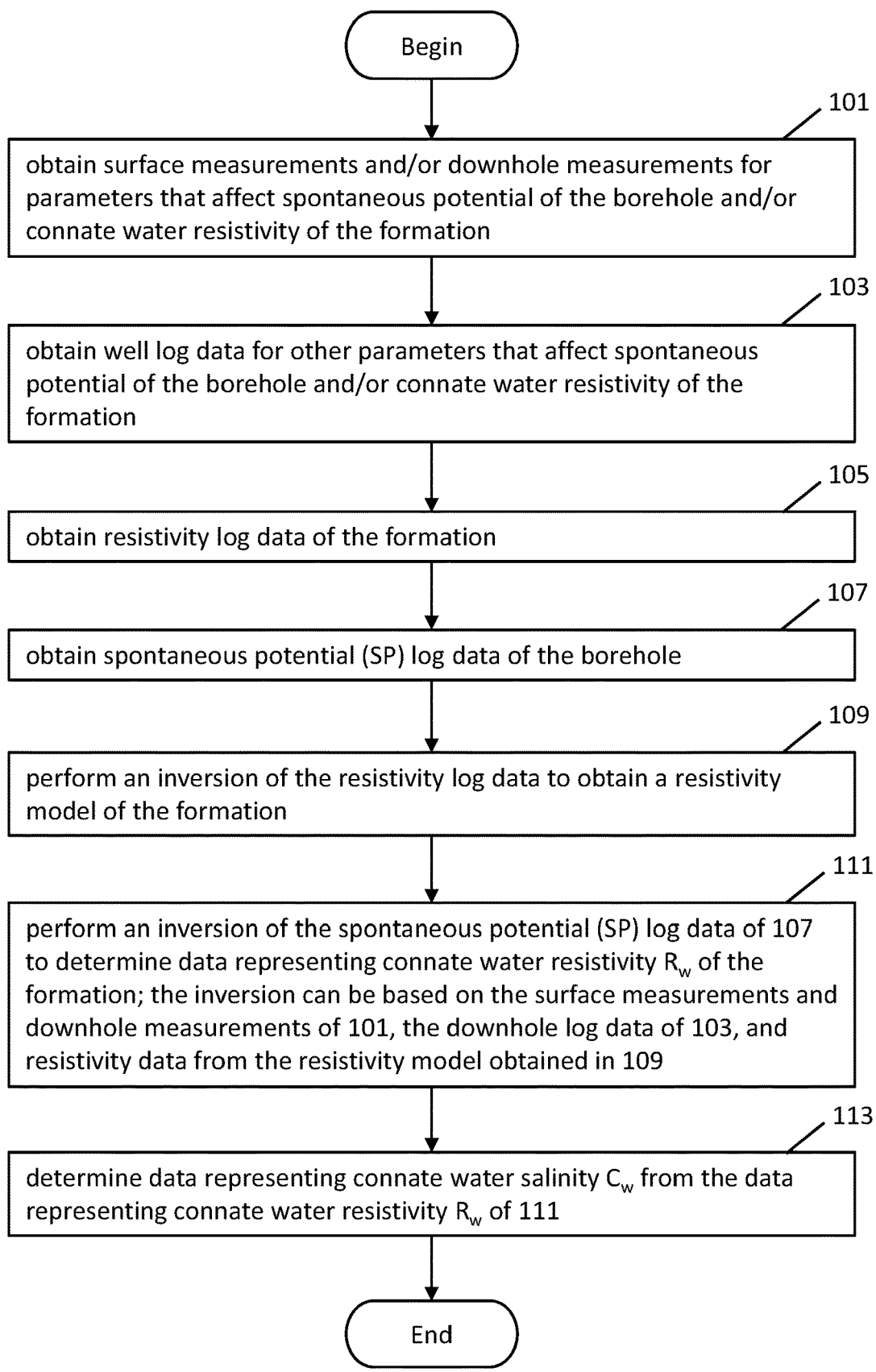
FIG. 1 is a flow chart illustrating aspects of a workflow that inverts SP log data to determine connate water resistivity ($R_w$) for the undisturbed zone and determines the connate water salinity ($C_w$) for the undisturbed zone from the connate water resistivity ($R_w$)

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

As used herein, "undisturbed zone" is the part of the formation that is not affected by the invasion of drilling fluid (which is commonly referred to as "mud").

As used herein, "invaded zone" is the volume of the formation that is close to the borehole in which some or all of the moveable formation fluids have been displaced by drilling fluid filtrate (which is commonly referred to as "mud filtrate").

In the early days of formation evaluation, spontaneous potential (SP) and resistivity were the only borehole measurements available to evaluate formation characteristics. Even today, SP logs and resistivity logs are fundamental measurements acquired by most well logging operations.

The SP log is a measurement of the voltage difference between a movable electrode in the borehole and a fixed electrode at the surface. This electrical potential is primarily generated as a result of exchanges of fluids of different salinities—those of the mud system and those in the formation. During the course of drilling, permeable rock at the surface of the borehole or near the borehole becomes invaded by drilling mud filtrate. If the filtrate is less saline than the formation fluids, negatively charged chlorine ions from the formation water cause the SP curve to deflect from a baseline established across impermeable formation rock. The magnitude of the deflection is influenced by a number of factors, including permeability, porosity, formation water salinity and mud filtrate properties. By the nature of deflections in the SP log data, the SP log data can indicate which interval of the formation is permeable, and a permeable formation interval with a high resistivity is more likely to contain hydrocarbons. There is a wide variety of applications that use SP log data for reservoir characterization, See for example, i) Doll, H. G., 1949, The SP log: theoretical analysis and principles of interpretation, Transactions of American Institute of Mining, Metallurgical and Petroleum Engineers, 179, 146-185; ii) Salazar, J. M., Wang, G. L., Torres-Verdin C., Lee, H. J., 2008, Combined simulation and inversion of SP and resistivity logs for the estimation of connate-water resistivity and Archie's cementation exponent, Geophysics, 73, E107-E114; iii) Schlumberger, 1989, Cased Hole Log Interpretation Principles/Applications; iv) Segesman, F., 1962, New SP correction charts: Geophysics, 27, 815-828; v) Zhang, G. J., and G. L. Wang, 1997, Application of vector potential theory to spontaneous potential calculation: Radio Science, 32, 899-905; and vi) Zhang, G. J., and G. L. Wang, 1999, A new approach to SP-vector potential approach: IEEE. Transactions on Geoscience and Remote Sensing, 37, 2092-2098.

The SP log data strongly depends on resistivity differences between borehole/invaded zone water and undisturbed zone water. The methods and systems of the present disclosure employ a workflow that inverts SP log data to determine the connate water resistivity ($R_w$) for the undisturbed zone and determines the connate water salinity ($C_w$) for the undisturbed zone from the connate water resistivity ($R_w$).

For production wells, the production well does not have an invaded zone nor a filter cake due to production, therefore SP log data provides little formation information. Furthermore, most of the production wells are steel cased, which makes acquiring SP log data impossible. Thus, for the case of characterizing connate water salinity ($C_w$) during production, the methods and systems of the present disclosure can employ downhole measurements obtained by a pulsed neutron tool to measure formation properties, such as elemental yields of chlorine (Cl), oxygen (O), and hydrogen (H) as well as capture cross-section (sigma or $\Sigma$), and such formation properties can be used to derive an estimate for connate water salinity ($C_w$) (and thus connate water resistivity ($R_w$)). In embodiments, the measured formation properties can be used to derive an estimate for the salinity of connate water that flows into the production well from a swept zone after water breakthrough. These operations can be repeated for subsequent periods of production. In this case, the methods and systems of the present disclosure can use the connate water salinity derived from the inversion of resistivity log data and SP log data (or derived from a trained ML system supplied with such log data as input) as a baseline measure of connate water salinity, and this baseline measure can be evaluated together with the connate water salinity estimates derived from the pulsed neutron tool measurements over time-lapsed periods of production to monitor the variation in the connate water salinity due to production.

In embodiments, the production can involve the application of enhanced oil recovery (EOR) techniques, such as natural gas driven production, water flooding, or other primary, secondary, and tertiary EOR techniques.

FIG. 1 is a flow chart illustrating aspects of a workflow that inverts SP log data to determine connate water resistivity ($R_w$) for the undisturbed zone and determines the connate water salinity ($C_w$) for the undisturbed zone from the connate water resistivity ($R_w$). In block 101, surface measurements and/or downhole measurements are obtained for parameters that affect spontaneous potential (SP) of the borehole and/or connate water resistivity ($R_w$) of the formation. The downhole measurements of block 101 can be obtained from one or more well logging tools that are deployed in a borehole that traverses the formation. In embodiments, the parameters obtained in block 101 can include one or more of the following: resistivity of the mud ($R_m$); resistivity of mud filtrate ($R_{mf}$); borehole diameter ($D_h$), and formation temperature (T).

In block 103, well log data is obtained for other parameters that affect spontaneous potential (SP) of the borehole and/or connate water resistivity of the formation. The well log data of block 103 can be obtained from one or more well logging tools that are deployed in the borehole that traverses the formation. In embodiments, the parameters obtained in block 103 can include formation thickness (h) as measured from gamma-ray log data and diameter of the invasion zone ($D_i$) as measured from array resistivity log data.

In block 105, resistivity log data of the formation is obtained. The resistivity log data of block 105 can be obtained from one or more well logging tools that are deployed in a borehole that traverses the formation. For example, in embodiments, the resistivity data can be obtained from an array induction resistivity tool.

In block 107, SP log data of the borehole is obtained. The SP log data of block 107 can be obtained from a well logging tool that is deployed in the borehole that traverses the formation. Examples of the well logging tools suitable for use in blocks 101 to 107 are described below with reference to FIGS. 7 and 8. The downhole SP measurement that determines the SP log data of block 107 has four main components:

1) the diffusion potential,
2) the membrane or Nernst potential (both are electrochemical potentials),
3) the electro-kinetic or streaming potential, and
4) the oxidation/reduction redox potential.

The electro-kinetic (No. 3) and redox potentials (No. 4) are usually negligible in borehole applications compared to the diffusion (No. 1) and membrane (No. 2) potentials. Thus, one can assume that the total potential measured by the downhole SP tool is solely the sum of the (No. 2) membrane and (No. 1) diffusion potentials.

Across a permeable interval, the diffusion potential is a result of the salinity difference between the invaded zone and undisturbed zone; the difference of cation exchange capacity (CEC) between a reservoir layer (such as sand) and its surrounding (above and or below) layers (such as shales) determines the membrane potential. The borehole SP measurement can be given by a sum of the diffusion and membrane potentials, expressed as:

$$SP = -70.7 \times \left(\frac{460 + T_F}{537}\right) \log\left(\frac{R_{mf}}{R_w}\right) \quad (1)$$

where $R_w$ designates the connate water resistivity, $R_{mf}$ is the mud-filtrate resistivity, and $T_F$ is the formation temperature in degrees Fahrenheit. Eq. (1) can be used to estimate $R_w$ by the inversion modeling as described herein.

It is noted that the inversion modeling based on Eq. (1) gives the spontaneous potential between a thick clean sand and a thick shale with a large cation exchange capacity $Q_v$ ($Q_v \to \infty$). The presence of clays in a sand will change its spontaneous potential, and hence change in the measured SP log data. In the inversion modeling based on Eq. (1), it is also assumed that the saline solution in both the borehole and the formation is NaCl, and a linear relationship exists between resistivity and salinity for both the mud filtrate and the connate water. Furthermore, the inversion modeling based on Eq. (1) is also based on an assumption that the relationship of resistivity and salinity for both the mud filtrate and the connate water is dependent on temperature and salt concentration and composition.

In block 109, an inversion of the resistivity log data of block 105 can be performed to obtain a resistivity model of the formation. In embodiments, the parameters of the formation resistivity model obtained in block 109 can include diameter of the invasion zone ($D_i$), resistivity of invaded zone ($R_{xo}$), and resistivity of undisturbed zone ($R_t$). Several methods exist for determining the resistivity model with the resistivity data, e.g. a radial one-dimensional inversion.

In block 111, an inversion of the SP log data of block 107 can be performed to determine data representing connate water resistivity ($R_w$) of the formation. In embodiments, the inversion can be based on the surface measurements and downhole measurements of block 101, the downhole log data of block 103, and resistivity data from the resistivity model obtained in block 109.

In embodiments, the connate water resistivity ($R_w$) for an interval of the borehole specified by a depth range z can be inverted by minimizing the following cost function:

$$\zeta(R_w) = \int dz [SP^M(z) - SP(z, R_w, R_{mf}, R_m, T, R_{xo}, R_t, D_i, D_h, h)]^2 \quad (2)$$

where $SP^M$ is the measured SP log data obtained in block 107 for the interval of the borehole specified by depth range z, $R_m$, $R_{mf}$, $D_h$ and T are parameters as described herein that are obtained in block 101, h is a parameter as described herein obtained in block 103, and $D_i$ and $R_{xo}$ and $R_t$ are part of a resistivity model of the formation that is determined through inversion of the resistivity log data of block 109. In Eq. (2), $R_w$ is an unknown that is solved through the inversion.

Note that in Eq. (2), a step profile invasion can be assumed for the mud filtrate invasion. Although the step profile invasion is probably the most practical approximation to a real field case, other types of invasion profiles do exist, e.g. a ramp profile invasion where a transition zone exists between the invaded and the undisturbed zones. In this case, the $R_w$ inverted based on Eq. (2) would be a first order approximation. Moreover, it is assumed that a parametric model is used in the inversion. Alternatively, a pixel inversion may be used instead so that the formation thickness (h) is not a necessary input. In a given interval, $R_{xo}$, $R_t$, and $D_i$ are each a continuous curve. Bed boundaries are then determined using the variation of the $R_{xo}$ and/or $R_t$ curves.

The processing of blocks 109 and 111 is configured as a sequential inversion where the inversion of SP log data is dependent upon the resistivity model obtained with the resistivity data and can only be conducted after the resistivity log data processing. In alternative embodiments, the inversion of the resistivity log data and the SP log data can be combined into one joint inversion that solves for both the resistivity model and SP model of the formation. Once this joint inversion is concluded, data representing the connate water resistivity ($R_w$) of the formation can be found simultaneously with the resistivity model and the SP model of the formation.

In block 113, data representing connate water salinity ($C_w$) is determined from the data representing connate water resistivity ($R_w$) determined in block 111. For example, the connate water salinity ($C_w$) can be determined from connate water resistivity ($R_w$) determined in block 111 and the formation temperature (T) of block 101 according to well-known correlations.

Figure 2:
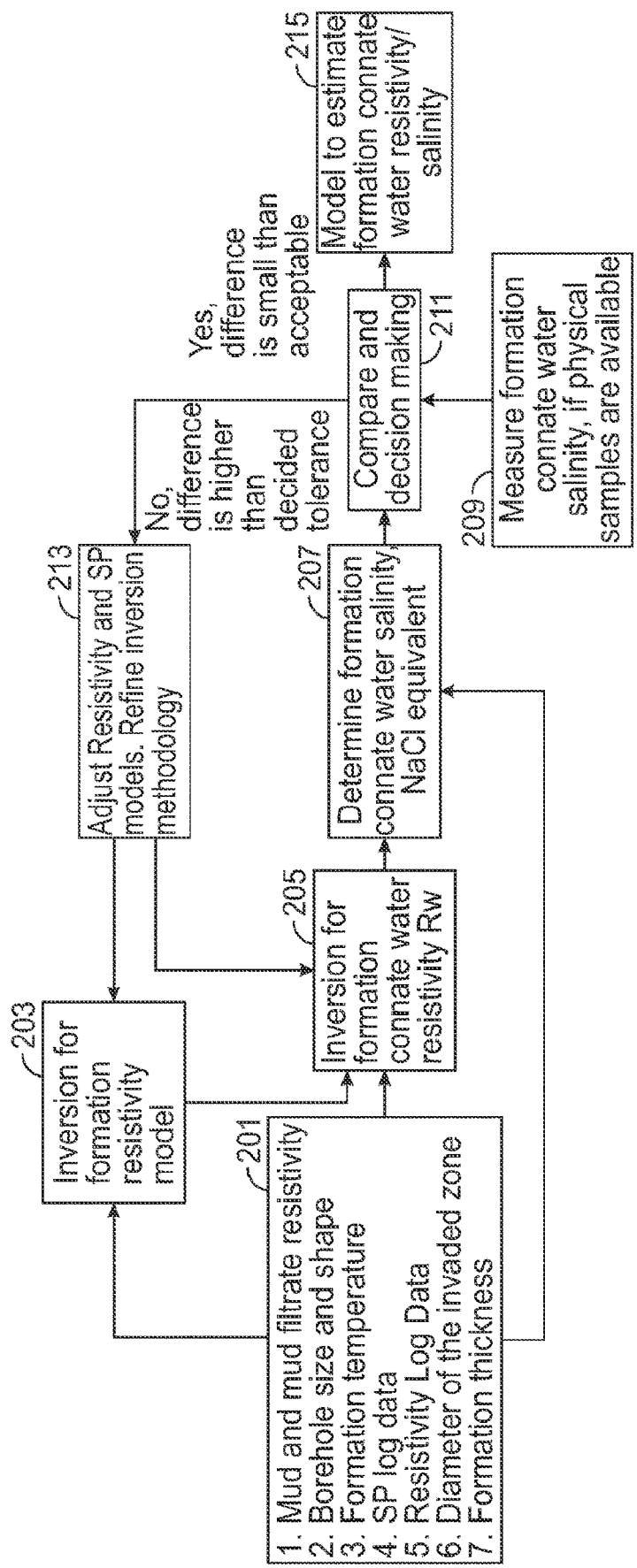
FIG. 2 is a schematic illustration of the workflow of FIG. 1.

FIG. 2 is a schematic illustration of the workflow of FIG. 1. Block 201 includes the parameter data and log data obtained in blocks 101, 103, 105 and 107 of FIG. 1. In block 203, an inversion of the resistivity log data (from block 201) is performed to obtain a resistivity model of the formation. These operations correspond to block 109 of FIG. 1.

In block 205, an inversion of the SP log data (from block 201) is performed to determine data representing connate water resistivity ($R_w$) of the formation. In embodiments, the inversion can be based on the parameter data of block 201 and resistivity data from the formation resistivity model obtained in block 203. These operations correspond to block 111 of FIG. 1.

In block 207, data representing connate water salinity ($C_w$) is determined from the data representing connate water resistivity ($R_w$) determined in block 205. These operations correspond to block 113 of FIG. 1.

In block 211, the data representing connate water salinity ($C_w$) as determined in block 207 is compared to measurements of connate water salinity of the formation determined from fluid analysis of physical samples of connate water of the same or similar formation (if and when available) in block 209. In the event that the differences are greater than a predetermined tolerance, the operations can continue to block 213; otherwise, the operations continue to block 215.

In block 213, the formation resistivity model used in block 203 and/or the SP model used in block 205 can be adjusted. Additionally or alternatively, the inversion methodology of blocks 203 and/or the inversion methodology of block 205 can be refined. In either case, the inversion modelling of block 203 and 205 can be repeated after adjustments or refinements to the inversion modelling to determine a new data value for connate water salinity ($C_w$) in block 207 for further evaluation in block 211.

In block 215, for the case where difference between the connate water salinity based on the inversion modeling and the physical measurement is less than a predetermined tolerance, or possibly when physical samples of connate water are not available, the data representing connate water salinity ($C_w$) of block 207 and the data representing connate water resistivity ($R_w$) of block 205 are output from the workflow and used as the best approximation to characterize the fluid properties (salinity and resistivity) of the connate water in the undisturbed zone of the formation.

Figure 3:
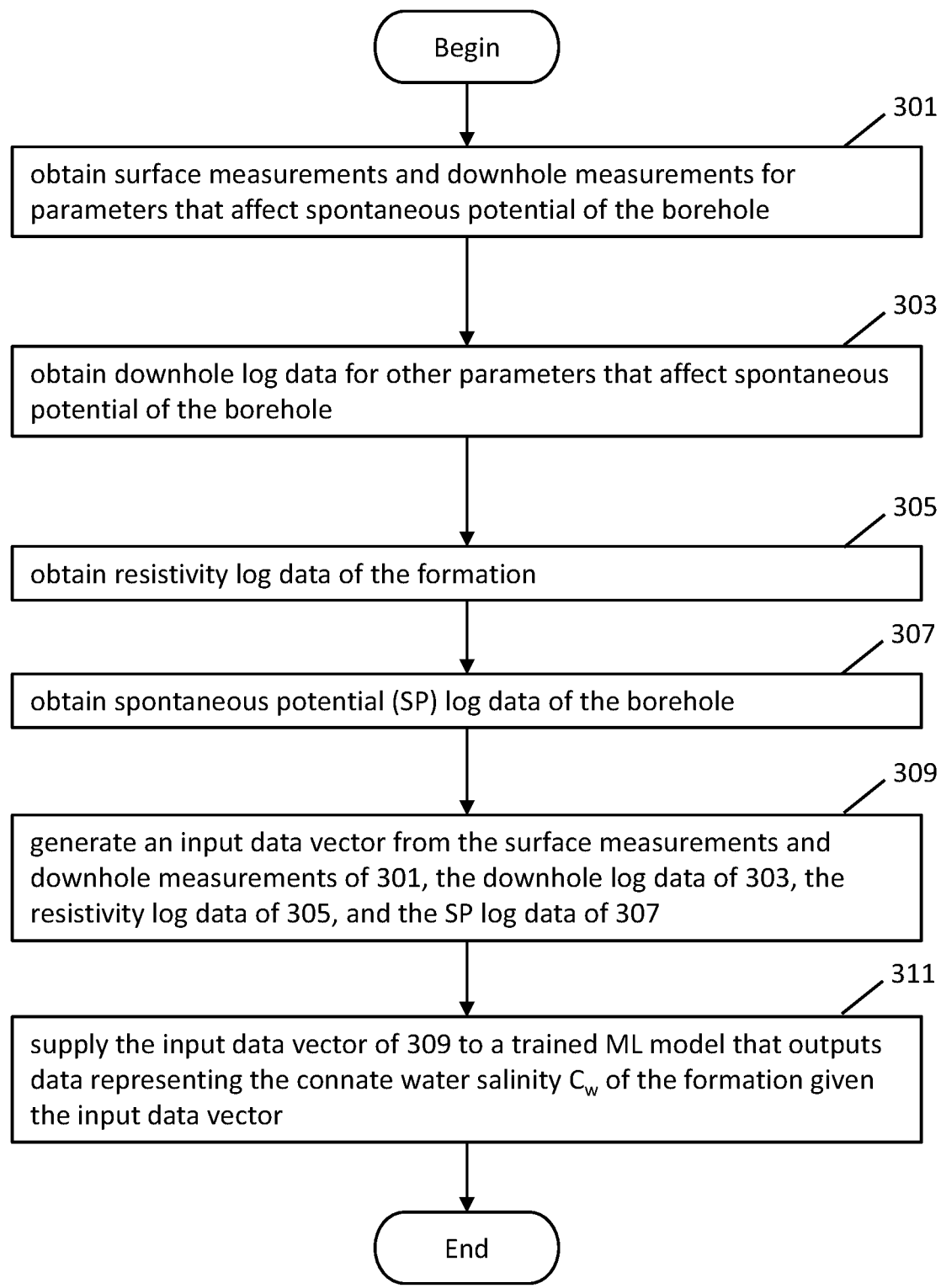
FIG. 3 is a flow chart illustrating aspects of a workflow that employs a trained machine learning model to determine the connate water resistivity ($R_w$) for the undisturbed zone of the formation from an input data vector that includes data representing parameters that affect the spontaneous potential of the borehole and/or connate water resistivity of the formation together with resistivity log data of the formation and SP log data of the borehole.

In other embodiments, the methods and systems of the present disclosure can employ a workflow that employs a trained machine learning model to determine the connate water resistivity ($R_w$) for the undisturbed zone of the formation from an input data vector that includes data representing parameters that affect spontaneous potential of the borehole and/or connate water resistivity of the formation together with resistivity log data of the formation and SP log data of the borehole. FIG. 3 is a flow chart illustrating aspects of a workflow that employs a machine learning model trained for this purpose.

In block 301, surface measurements and/or downhole measurements are obtained for parameters that affect spontaneous potential (SP) of the borehole. The downhole measurements of block 301 can be obtained from one or more well logging tools that are deployed in a borehole that traverses the formation. In embodiments, the parameters obtained in block 301 can include one or more of the following: resistivity of the mud ($R_m$); resistivity of mud filtrate ($R_{mf}$); borehole diameter ($D_h$), and formation temperature (T).

In block 303, well log data is obtained for other parameters that affect spontaneous potential (SP) of the borehole. The well log data of block 303 can be obtained from one or more well logging tools that are deployed in the borehole that traverses the formation. In embodiments, the parameters obtained in block 303 can include cation exchange capacity ($Q_v$ or CEC) as measured from nuclear log data (such as LithoScanner, commercially available from Schlumberger of Houston, Texas).

In block 305, resistivity log data of the formation is obtained. The resistivity log data of block 305 can be obtained from one or more well logging tools that are deployed in a borehole that traverses the formation. For example, in embodiments, the resistivity data can be obtained from an array induction resistivity tool.

In block 307, SP log data of the borehole is obtained. The SP log data of block 307 can be obtained from a well logging tool that is deployed in the borehole that traverses the formation. Examples of the well logging tools suitable for use in blocks 301 to 307 are described below with reference to FIGS. 7 and 8.

In block 309, an input data vector is generated from the surface measurements and downhole measurements of 301, the downhole log data of 303, the resistivity log data of 305, and the SP log data of 307.

In block 311, the input data vector of 309 is supplied as input to a trained machine learning (ML) model that outputs data representing the connate water salinity ($C_w$) of the formation given the input data vector.

Figure 4:
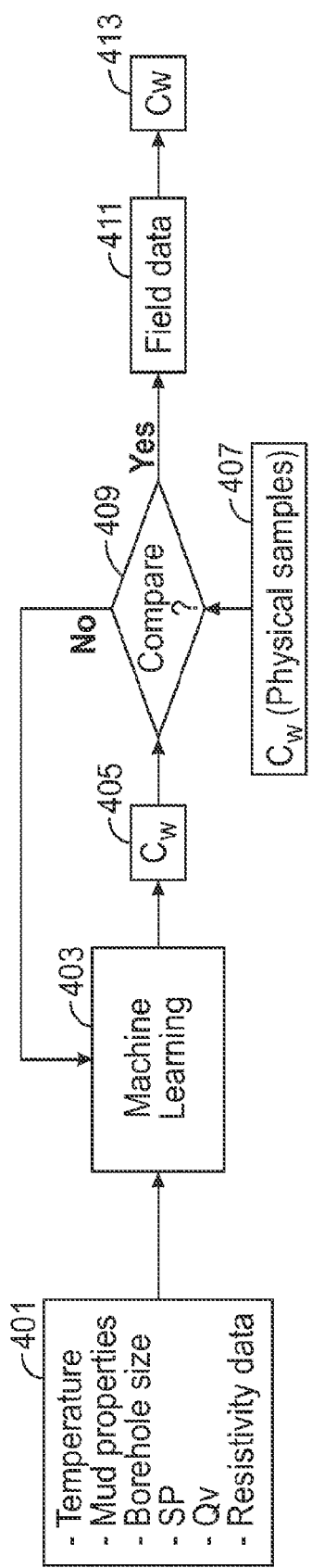
FIG. 4 is a schematic illustration of a workflow that can be used to train the machine learning (ML) model used in the workflow of FIG. 3.

FIG. 4 is a schematic illustration of a workflow that can be used to train the ML model used in block 311 of FIG. 3.

Block 401 includes the parameter data and log data obtained in blocks 301, 303, 305 and 307 of FIG. 3.

In block 403, a machine learning model, such as a nonlinear regression model or a deep neural network, is trained to fit the relationship between the input log data and measured or estimated connate water salinity ($C_w$) values. For example, one or more connate water salinity ($C_w$) values can be measured from downhole fluid analysis or laboratory fluid analysis of physical samples of connate water. In another example, one or more connate water salinity ($C_w$) values can be estimated from the inversion of the log data of block 401 (e.g., such as sequential or joint inversion operations described above with respect to FIG. 2).

In block 405, data representing connate water salinity ($C_w$) is determined as an output of block 403 using the machine learning model.

In block 409, the data representing connate water salinity ($C_w$) as determined in block 405 is compared to measurements of connate water salinity of the formation determined from fluid analysis of physical samples of connate water of the same or similar formation (if and when available) in block 407. In the event that the differences are greater than a predetermined tolerance, the operations can go back to block 403, corresponding to the training phase of the machine learning process; otherwise, the operations continue to block 413, corresponding to the use of the learned model to process field data other than those used in the training process as provided in block 411.

In block 413, for the case where difference between the connate water salinity based on the machine learning (ML) and the physical measurement is less than a predetermined tolerance, the learning of the machine learning model is completed. The learned model is then used to process the field data other than those used in the learning process to determine connate water salinity ($C_w$) therein.

In embodiments, the ML model (block 311 and 403) can be an artificial neural network or other suitable supervised machine learning system that is trained using regression, neural network methodology or any other artificial intelligence algorithm.

For the case of characterizing connate water salinity ($C_w$) during production, the methods and systems of the present disclosure can employ downhole measurements obtained by a pulsed neutron tool to measure formation properties, and such formation properties can be used to derive an estimate for connate water salinity ($C_w$) (and then connate water resistivity ($R_w$)). In embodiments, the measured formation properties can be used to derive an estimate for the salinity of connate water that flows into the production well from a swept zone after water breakthrough. These operations can be repeated for subsequent periods of production. In this case, the methods and systems of the present disclosure can use the connate water salinity derived from the inversion of resistivity log data and SP log data (or derived from a trained ML system supplied with such log data as input) as a baseline measure of connate water salinity, and this baseline measure can be evaluated together with the connate water salinity estimates derived from the pulsed neutron tool measurements over time-lapsed periods of production to monitor the variation in the connate water salinity due to production. In embodiments, the production can involve the application of enhanced oil recovery (EOR) techniques, such as natural gas driven production, water flooding, or other primary, secondary, and tertiary EOR techniques.

Figure 5:
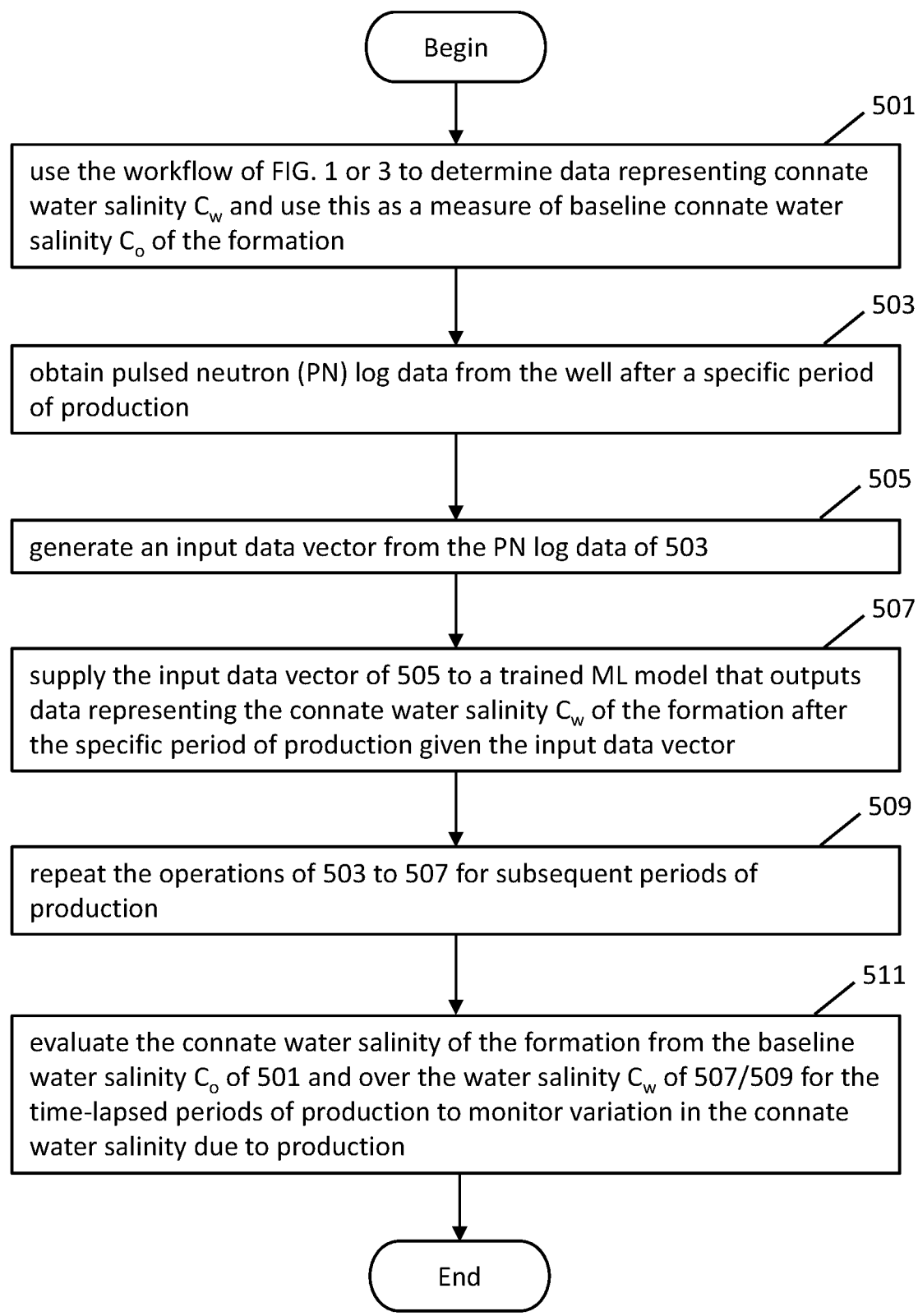
FIG. 5 is a flow chart illustrating aspects of a workflow that characterizes connate water salinity ($C_w$) during production.

FIG. 5 is a flow chart illustrating aspects of a workflow that characterizes connate water salinity ($C_w$) during production.

In block 501, the workflow of FIG. 1 or 2 (or the workflow of FIG. 3 or 4) is used to determine data representing connate water salinity $C_w$, and such data is used as a measure of baseline connate water salinity $C_o$ of the formation.

In block 503, pulsed neutron (PN) log data is obtained from the well after a specific period of production. The PN log data of block 503 can be obtained from a well logging tool that is deployed in the production well. In embodiments, the well logging tool can employ a pulsed neutron generator (PNG) with multiple scintillation gamma ray detectors to obtain PN log data that represents one or more formation properties, such as elemental yields for chlorine (Cl), oxygen (O), and hydrogen (H) in the formation and capture cross-section (sigma or $\Sigma$). Such formation properties can be used to derive an estimate for connate water salinity ($C_w$). Examples of a well logging tool suitable for use in block 503 is described below with reference to FIG. 8.

In block 505, an input data vector is generated from the PN log data of 503 and possibly other data (such as data representing formation parameters related to basic sediment (BS), lithology, and porosity of the formation).

In block 507, the input data vector of 505 is supplied to a trained ML model that outputs data representing the connate water salinity CG of the formation after the specific period of production given the input data vector.

In block 509, the operations of 503 to 507 can be repeated for subsequent periods of production.

In block 511, the connate water salinity of the formation is evaluated over time from the baseline connate water salinity $C_o$ of 501 and over the connate water salinity CG of 507/509 for the time-lapsed periods of production to monitor variation in the connate water salinity due to production.

Figure 9:
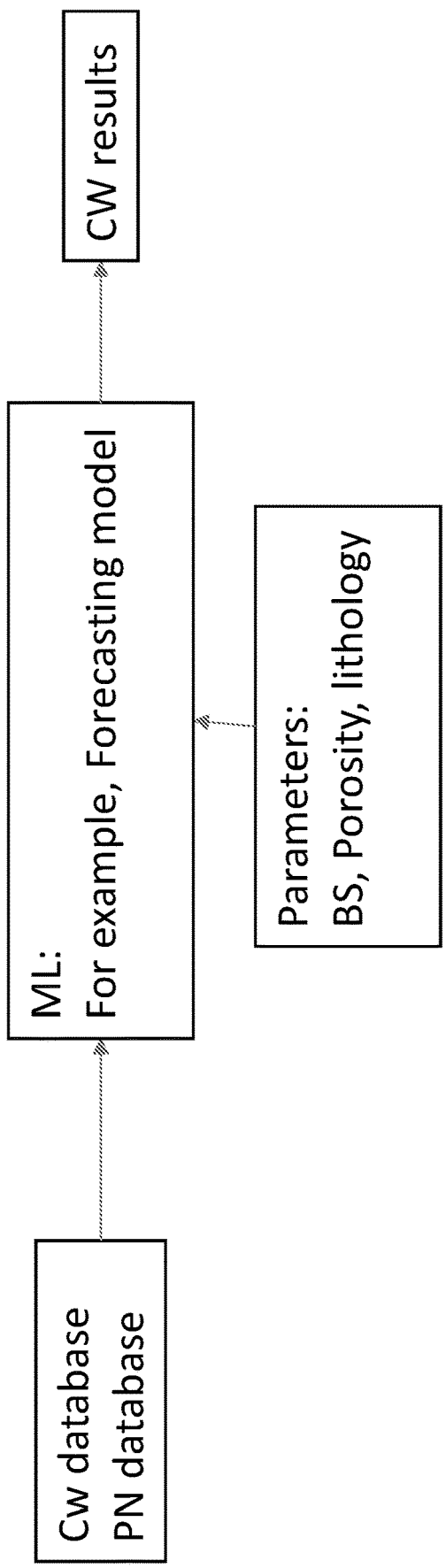
FIG. 9 is a flow chart illustrating aspects of a workflow that trains a machine learning (ML) model to predict connate water salinity ($C_w$) during production.

In embodiments, the ML model can be trained from one or more databases that include data representing connate water salinity CG and corresponding PN log data (e.g., PN log data that represents one or more formation properties, such as elemental yields for chlorine (Cl), oxygen (O), and hydrogen (H) in the formation and capture cross-section (sigma or $\Sigma$)) together with data representing formation parameters (such as basic sediment (BS), lithology, and porosity of the formation) for different formations (or varying formation locations). A set of input data vectors are generated from the PN log data and corresponding formation parameter data for different formations (or varying formation locations). The data representing connate water salinity CG for the different (or varying formation locations) is used to generate label data corresponding to the respective input data vectors and the input data vectors and corresponding label data are then used to train the machine learning model such that the ML model predicts connate water salinity $C_w$ given an arbitrary input data vector. The training operations can be repeated over a large set of training samples that is sufficient to train the ML model of block 507. An example of these ML model training operations is illustrated in FIG. 9.

In embodiments, the ML model of block 507 can be an artificial neural network or other suitable supervised machine learning system that is trained using regression, neural network methodology or any other artificial intelligence algorithm.

In other embodiments where the production environment (i.e., production well) employs an openhole completion that has no casing or liner set across the reservoir formation and thus permits produced fluids to flow directly into the borehole, the methods and systems of the present disclosure can employ downhole pulsed-neutron measurements and downhole dielectric dispersion measurements to derive an estimate for connate water salinity ($C_w$) during production. For example, dielectric dispersion measurements can be inverted to yield connate water salinity ($C_w$), water-filled porosity ($\phi_w$), and water-phase tortuosity (MN). However, for cases when the connate water salinity is high, such inversion can be problematic due to the loss of sensitivity of the dielectric dispersion measurements in these conditions. Thus, for cases when the connate water salinity is high, pulsed-neutron sigma measurements provide excellent sensitivity to water salinity and thus offer a good complement to the dielectric measurements. In this case, the pulsed-neutron sigma measurements and the dielectric dispersion measurements can be jointly inverted to yield the same parameters: connate water salinity ($C_w$), water-filled porosity ($\phi_w$), and water-phase tortuosity (MN). Details of this process is set forth in the paper SPE-181366-MS, entitled "Water Salinity Determination Over an Extended Salinity Range Using a Joint Interpretation of Dielectric and Neutron Cross-Section Measurements," by J. M. Donadille, R. Leech, and I. Pirie, Schlumberger, 2016. These inversion operations can be repeated over multiple periods of production. Furthermore, the connate water salinity of the formation can be evaluated over time from the baseline connate water salinity $C_o$ (which is based on the workflow of FIG. 1 or 2 or the workflow of FIG. 3 or 4) and over the connate water salinity $C_w$ for the time-lapsed periods of production to monitor variation in the connate water salinity due to production.

Figure 6:
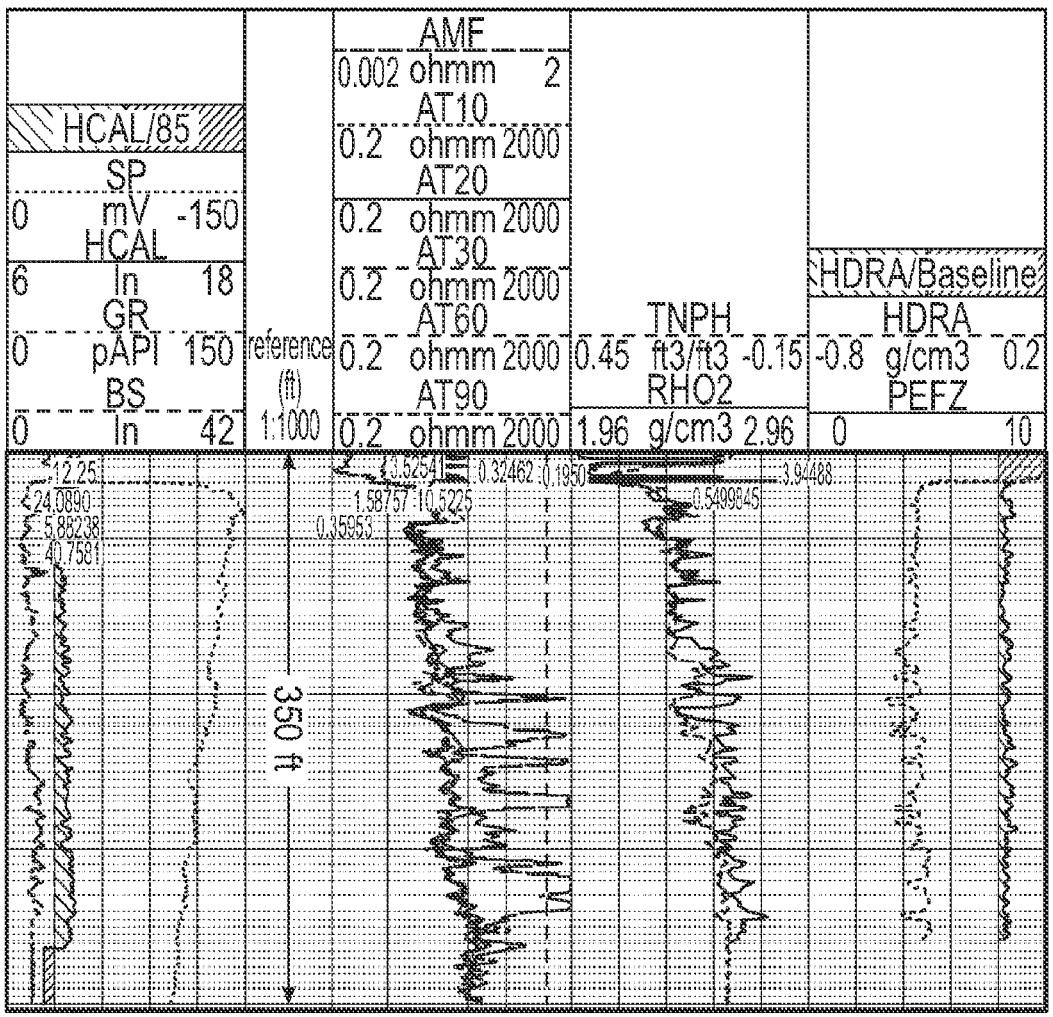
FIG. 6 depicts plots that illustrate the inversion of formation resistivity ($R_w$) from SP log data according to the workflow of FIGS. 1 and 2 for an example oilfield.

FIG. 6 illustrates an example of logs used in the inversion of formation resistivity $R_w$ from SP log data according to the workflow of FIGS. 1 and 2 for an example oilfield. Track 1 shows logs of SP, HCAL (caliper), GRw BS (bit size), Track 2 is measurements of array resistivities with depth of investigations of 10", 20", 30", 60", and 90", and also mud resistivity at bottom hole temperature (AMF), density (RHOZ) and neutron (TNPH) logs are shown in Track 3, and Track 4 shows the logs of Pef (PEFZ) and delta density (HDRA).

Figure 7:
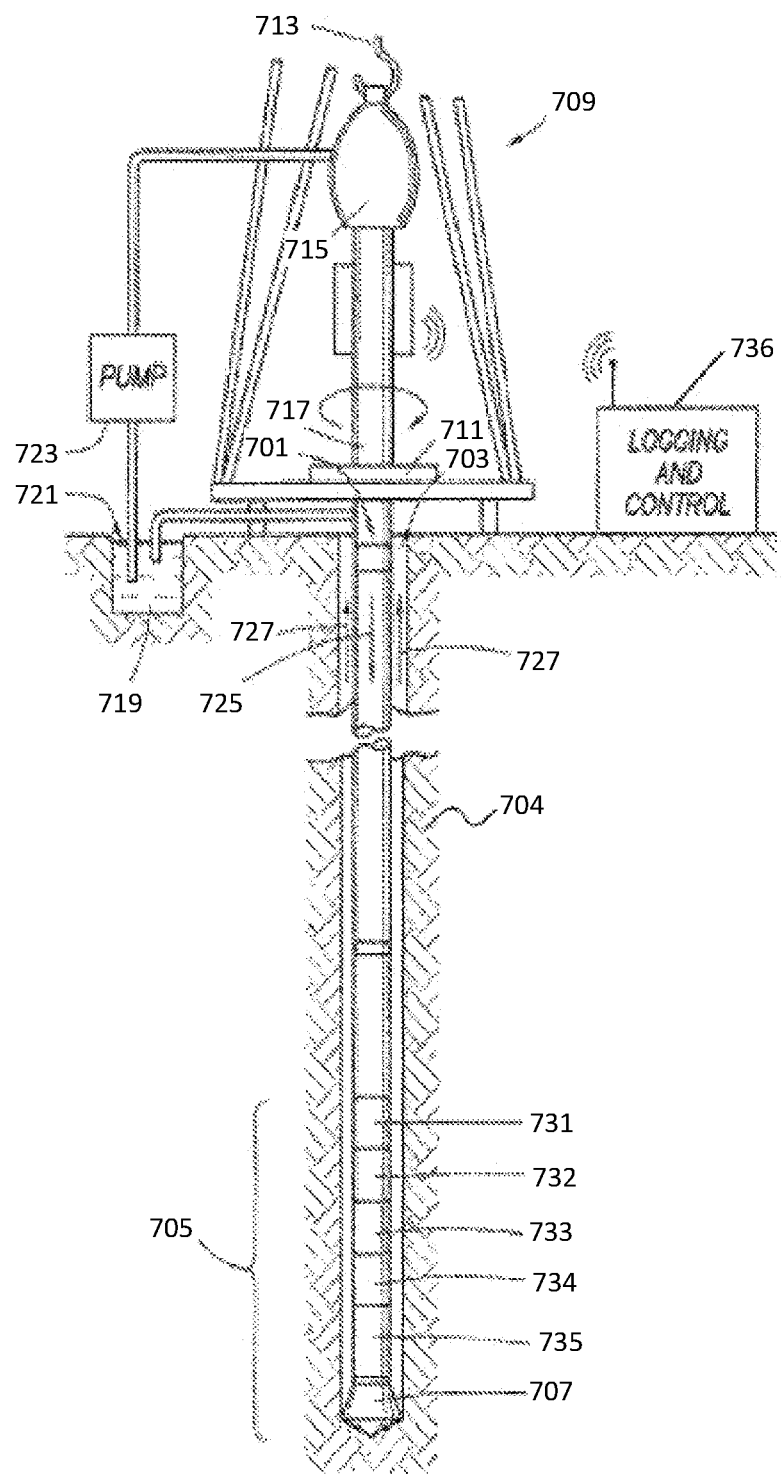
FIG. 7 is a schematic diagram of a wellsite that includes while drilling logging and measurement instrumentation.

FIG. 7 illustrates a wellsite environment in which the disclosed methods and workflows can be employed to process acquired measurements. The wellsite can be onshore or offshore. In this environment, a borehole is formed in subsurface formations by rotary drilling in a manner that is well known.

A drill string 701 is suspended within a borehole 703 that traverses a subsurface formation 704. The drill string 701 has a bottom hole assembly (BHA) 705 which includes a drill bit 707 at its lower end. A surface system 709 includes platform and derrick assembly positioned over the borehole 703, the assembly including a rotary table 711, kelly (not shown), hook 713, and rotary swivel 715. The drill string 701 is rotated by the rotary table 711. The rotary table 711 is energized by means not shown, which engages the kelly (not shown) at the upper end 717 of the drill string 701. The drill string 701 is suspended from the hook 713, attached to a traveling block (also not shown), through the kelly (not shown) and the rotary swivel 715 which permits rotation of the drill string 701 relative to the hook 713. As is well known, a top drive system could be used instead of the system shown in FIG. 7.

In the illustrated example, the surface system further includes drilling fluid or mud 719 stored in a pit 721 formed at the well site. A pump 723 delivers the drilling fluid to the interior of the drill string 701 via a port (not shown) in the swivel 715, causing the drilling fluid to flow downwardly through the drill string 701 as indicated by the directional arrow 725. The drilling fluid exits the drill string 701 via ports (not shown) in the drill bit 707, and then circulates upwardly through an annulus region between the outside of the drill string 701 and the wall of the borehole 703, as indicated by the directional arrows 727. In this well-known manner, the drilling fluid lubricates the drill bit 707 and carries formation cuttings up to the surface as it is returned to the pit 721 for recirculation.

The BHA 705 of the illustrated embodiment may include a measuring-while-drilling (MWD) tool 731, a logging-while-drilling (LWD) tool 734, a rotary steerable directional drilling system and motor 735, and the drill bit 707. It will also be understood that more than one LWD tool and/or MWD tool can be employed, e.g., as represented at 733.

The LWD tool 734 is housed in a special type of drill collar, as is known in the art, and can contain one or a plurality of known types of logging tools. The LWD tool may include capabilities for measuring, processing, and storing information, as well as for communicating with the surface equipment. In the present example, the LWD tool 734 provides for measurements of spontaneous potential (SP), formation resistivity and possibly other downhole measurements suitable for use in the workflows of the present disclosure.

The MWD tool 731 is also housed in a special type of drill collar, as is known in the art, and can contain one or more devices for measuring characteristics of the drill string and drill bit. The MWD tool 731 further includes an apparatus 732 for generating electrical power to the downhole system. This may typically include a mud turbine generator powered by the flow of the drilling fluid, it being understood that other power and/or battery systems may be employed. In the present embodiment, the MWD tool 731 may include one or more of the following types of measuring devices: a weight-on-bit measuring device, a torque measuring device, a vibration measuring device, a shock measuring device, a stick slip measuring device, a direction measuring device, and an inclination measuring device. The power generating apparatus 732 may also include a drilling fluid flow modulator for communicating measurement and/or tool condition signals to the surface for detection and interpretation by a logging and control unit 736.

Figure 8:
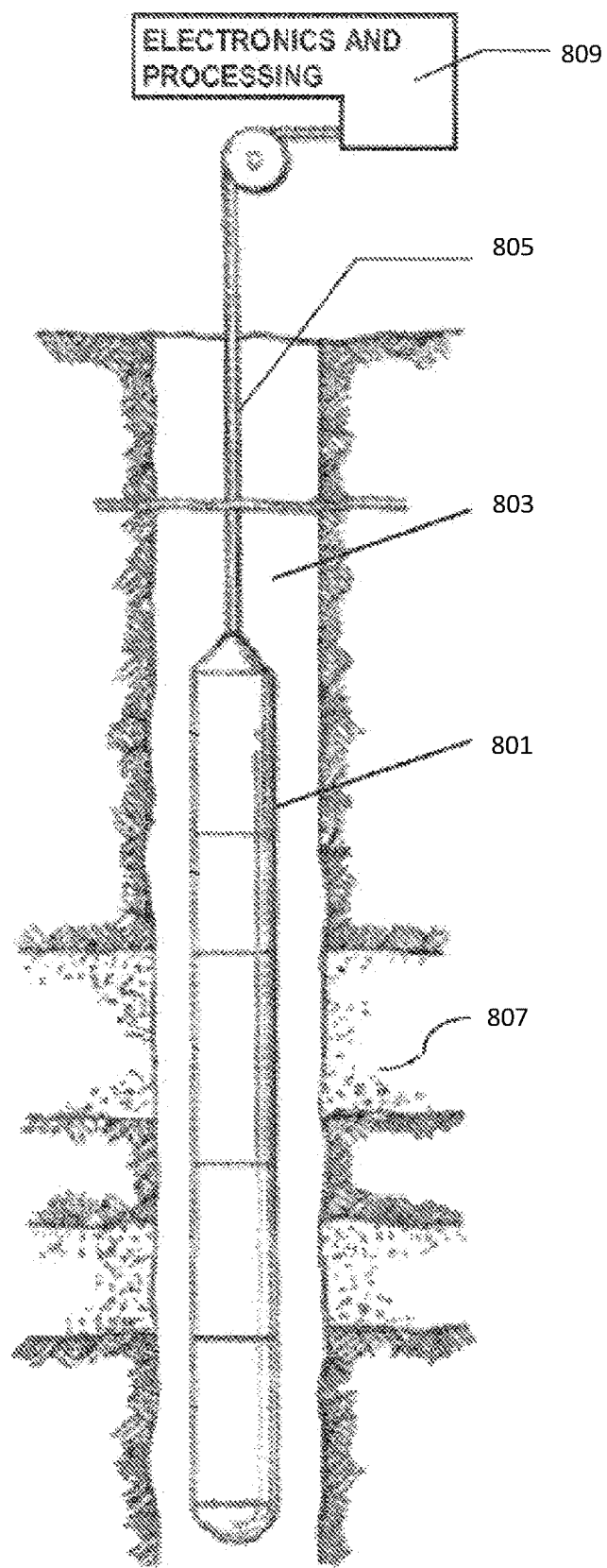
FIG. 8 is a schematic diagram of wireline logging instrumentation.

Referring to FIG. 8, an example wireline tool 801 is shown that may be another environment in which aspects of the present disclosure may be implemented. The example wireline tool 801 is suspended in a borehole 803 from the lower end of an armored multiconductor cable 805 that is spooled on a winch (not shown) at the Earth's surface. The borehole 803 traverses a subsurface formation 807. At the surface, the cable 805 is communicatively coupled to an electronics and processing system 809. The example wireline tool 801 includes an elongated body that embodies one or more logging tools suitable for performing the downhole logging measurements as described herein. For example, the Dual Induction-Spherically Focused Resistivity Tool (or DIT) commercially-available from Schlumberger of Houston, Texas, provides measurements of spontaneous potential (SP) and three different formation resistivity values: IDPH (deep induction), IMPH (medium induction), and SFLU (shallow spherically focused resistivity) suitable for use in the workflows of the present disclosure. In another example, the RSTPro tool commercially-available from Schlumberger of Houston, Texas, provides for pulsed neutron measurements in an open borehole or production well and is suitable for use in the workflows of the present disclosure. Of course, the techniques and workflows disclosed herein are useful in other wellsite environments.

Though FIGS. 7 and 8 illustrate examples of while-drilling and wireline systems of conveyance, respectively, other systems of conveyance can be used. Examples of other systems of conveyance that can be used with certain aspects described in the foregoing disclosure include coiled tubing, drill-pipe, and slickline systems.

Figure 10:
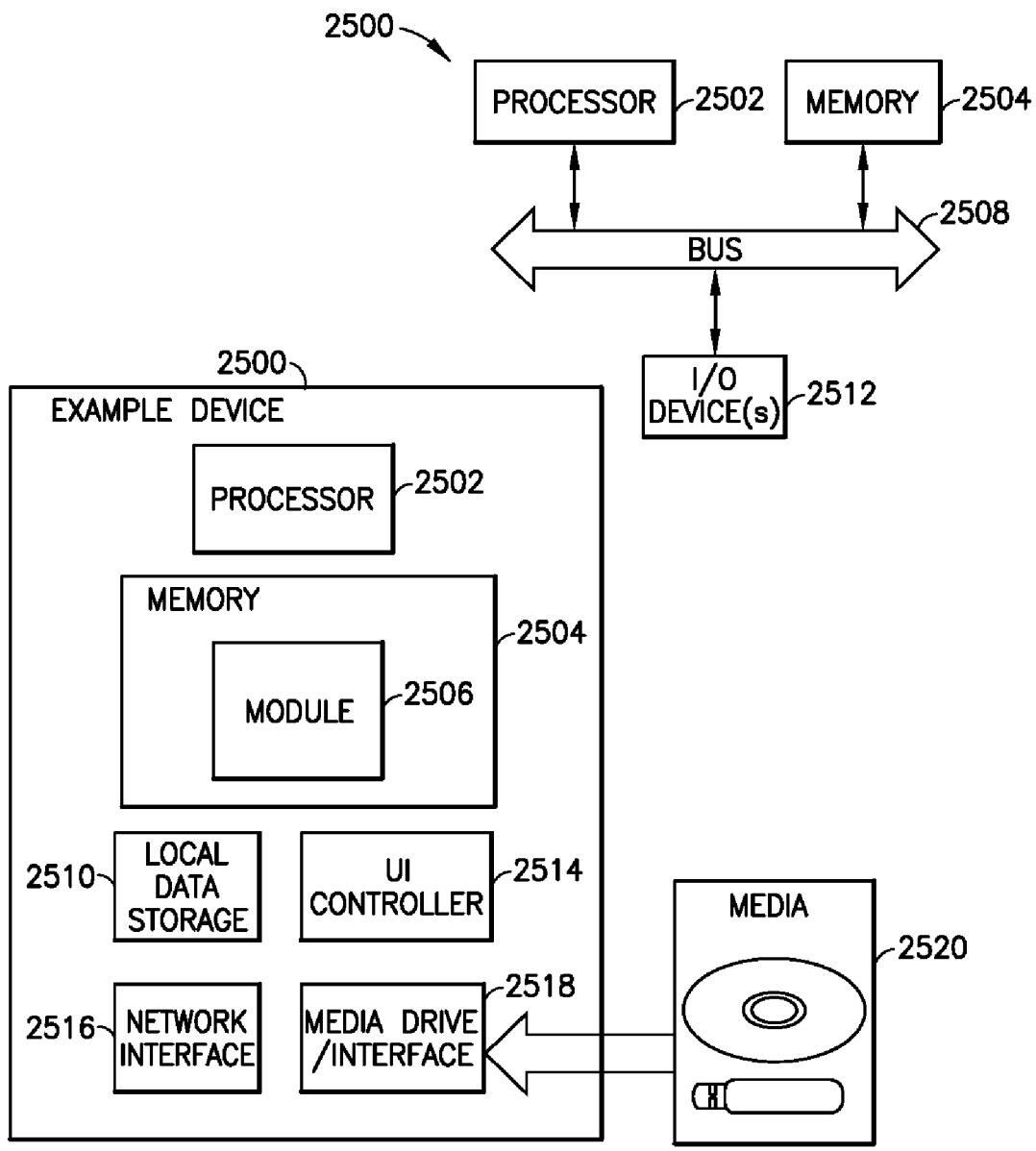
FIG. 10 is a schematic diagram of an example computing system.

In some embodiments, the methods and systems of the present disclosure may involve a computing system. FIG. 10 illustrates an example computing system 2500, with a processor 2502 and memory 2504 that can be configured to implement various embodiments of the subject disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claims expressly uses the words 'means for' together with an associated function.

What is claimed is:

1. A method for characterizing connate water salinity and resistivity of a subsurface formation, comprising:

i) obtaining, via a processing system, well log data measured by at least one downhole tool disposed within a borehole that traverses the subsurface formation, wherein the well log data is acquired during a drilling operation performed by a drill string within the borehole, and wherein the well log data includes resistivity log data and spontaneous potential (SP) log data;

ii) performing, via the processing system, inversion operations that invert the resistivity log data of i) to determine a resistivity model of the subsurface formation, wherein the inversion operations of ii) are based on an assumption of a step profile invasion for mud filtrate invasion;

iii) determining, via the processing system, a connate water resistivity of the subsurface formation for an interval of the borehole associated with a depth range by minimizing a cost function of the SP log data, wherein the cost function comprises the SP log data, the depth range of the borehole, a resistivity of mud in the subsurface formation, a resistivity of mud filtrate in the subsurface formation, the resistivity model, and a plurality of properties associated with the borehole obtained from the well log data;

iv) determining, via the processing system, a connate water salinity of the subsurface formation based on the connate water resistivity of the subsurface formation for the interval of the borehole as determined in iii), wherein the connate water salinity of the subsurface formation corresponds to an invaded zone of the subsurface formation associated with the drilling operation; and v) using, via the processing system, the connate water salinity of the subsurface formation of iv) as training data for training a machine learning model, wherein the machine learning model predicts connate water salinity of an undisturbed zone of the subsurface formation for future drilling operations based on a result of the training and an input data vector associated with the undisturbed zone of the subsurface formation, and wherein the undisturbed zone of the subsurface formation is different from the invaded zone of the subsurface formation.

2. The method of claim 1, wherein:
the inversion operations of ii) employ at least one parameter that affects spontaneous potential of the borehole and/or the connate water resistivity of the subsurface formation, wherein a data value for the at least one parameter is obtained from surface measurements or well log measurements.

3. The method according of claim 2, wherein:
the at least one parameter is selected from the group consisting of: the resistivity of the mud ($R_m$), the resistivity of mud filtrate ($R_{mf}$), borehole diameter ($D_h$), formation temperature (T), formation thickness (h), and combinations thereof.

4. The method according of claim 1, wherein:
the resistivity model includes a diameter of an invasion zone ($D_i$), resistivity of the invaded zone ($R_{xo}$), and resistivity of the undisturbed zone ($R_t$).

5. The method of claim 1, wherein:
the cost function is in the form:

$$\zeta(R_w) = \int dz \left[ SP^M(z) - SP(z, R_w, R_{mf}, R_m, T, R_{xo}, R_t, D_i, D_h, h) \right]^2$$

where $SP^M$ is the measured SP log data for the interval of the borehole specified by the depth range z, $R_m$ is the resistivity of the mud, $R_{mf}$ is the resistivity of mud filtrate, $D_h$ is a borehole diameter, T is a subsurface formation temperature, h is a subsurface formation thickness, and each is obtained from surface measurements or the well log data;

$D_i$ is diameter of an invasion zone, where $D_i$, $R_{xo}$, and $R_t$ are part of the resistivity model of the subsurface formation that is determined through inversion of the resistivity log data; and $R_w$ is the connate water resistivity.

6. The method of claim 1, wherein:
the inversion operations of ii) are based on an assumption that a linear relationship exists between resistivity and salinity for both mud filtrate and connate water.

7. The method of claim 1, wherein:
the inversion operations of ii) are based on an assumption that a relationship between resistivity and salinity for both mud filtrate and connate water is dependent on temperature, salt concentration, and salt composition.

8. The method of claim 1, wherein:
the inversion operations of ii) employ a parametric model or a pixel-based inversion.

9. The method of claim 1, wherein:
the resistivity log data of i) is obtained from an array induction resistivity tool disposed within the borehole.

10. The method of claim 1, wherein:
the at least one downhole tool of i) comprises a logging-while drilling tool or a wireline tool.

11. The method of claim 1, wherein:
the input data vector further includes parameter data for at least one parameter that affects spontaneous potential of the borehole and/or the connate water resistivity of the subsurface formation, wherein the parameter data is obtained from surface measurements or well log measurements.

12. The method of claim 11, wherein:
the at least one parameter is selected from the group consisting of: the resistivity of the mud ($R_m$), the resistivity of mud filtrate ($R_{mf}$), borehole diameter ($D_h$), formation temperature (T), formation thickness (h), and combinations thereof.

13. The method of claim 1, further comprising:
monitoring one or more variations in the connate water salinity of the invaded zone by using the downhole tool to obtain pulsed neutron (PN) log data, wherein the PN log data indicates one or more additional variations in the connate water salinity over one or more time-lapsed periods of hydrocarbon production; and
using the PN log data as additional training data for training the machine learning model.

14. The method of claim 13, wherein:
the one or more time-lapsed periods of hydrocarbon production involve the application of at least one enhanced oil recovery (EOR) technique.

15. The method of claim 14, wherein:
the at least one EOR technique comprises natural gas driven production, water flooding, or other primary, secondary, and tertiary EOR techniques.

16. The method of claim 13, wherein:
the PN log data comprises dielectric dispersion measurements and optionally pulsed-neutron sigma measurements of the subsurface formation.

17. The method of claim 13, wherein:
the PN log data measures elemental yields for chlorine, oxygen, hydrogen, or any combination thereof in the subsurface formation.

18. The method of claim 13, wherein:
the downhole tool employs a pulsed neutron generator with multiple scintillation gamma ray detectors to obtain the PN log data.

19. The method of claim 1, wherein:
the machine learning model is trained using laboratory fluid analysis of physical samples of connate water obtained from the borehole.

20. The method of claim 1, wherein:
the machine learning model is a nonlinear regression model or a deep learning neural network model.

* * * * *